United States Patent Office

3,437,536
Reissued Apr. 8, 1969

3,437,536
BOND STRENGTH FOR FOAM-METAL LAMINATES
Gerald G. Vincent and Joseph E. Burkholder, Midland, Mich., assignors to The Dow Chemical Company, Midland, Mich., a corporation of Delaware
No Drawing. Filed Dec. 31, 1964, Ser. No. 422,526
Int. Cl. B32b 5/20, 15/04
U.S. Cl. 156—78    9 Claims

ABSTRACT OF THE DISCLOSURE

The present invention provides a method of producing foam to metal laminates having improved bond strength which comprises (1) adhering to at least one metal substrate a layer of a thermoplastic olefin polymer composition having a relative crystallinity of at least 30 percent, said olefin polymer composition containing a solid decomposable blowing agent, (2) heating the resulting laminate to a temperature of at least 140° C. to expand the polymer layer and (3) subsequently cooling said laminate to room temperature.

---

Laminated articles having foamed plastic cores are well known in the art. Constructions particularly familiar are found in insulating panels, moisture resistant panels, reinforcement panels and the like. A method employed in the art proposes the use of an adhesive between the foamed core and outer substrates and subjecting the resulting assembly to elevated temperature and pressure to accomplish the bond between the respective layers. This method is not satisfactory in that air bubbles tend to form between the foamed core and outer substrates thus preventing the formation of a continuously bonded surface.

Polymers which can be employed in practicing the present invention include olefin polymers having a relative crystallinity of at least 30 percent as determined by X-ray diffraction. Olefin polymers having lower than 30 percent relative crystallinity are too soft and therefore too flexible to obtain a laminate structure having sufficiently high bond strength. Specific examples of suitable olefin polymer materials include polyethylene, polypropylene, polybutene-1, poly(4-methyl-1-pentene) and the like and also olefin copolymers such as ethylene and propylene, ethylene and butene-1, ethylene and 4-methyl-1-pentene, ethylene and acrylic acid, and the like, provided these have the requisite crystallinity of at least 30 percent as specified. The foaming of polymers such as polystyrene and polyvinyl chloride have been found to produce undesirable laminate structures when employed in the method of the present invention. Foams made from such polymers are too stiff and will not satisfactorily adhere to a metal substrate to provide strong bond strength.

The blowing agents employed in the polymer portion of the invention are solid decomposable blowing agents having a decomposition temperature above the melting point of the polymer. Specific examples of suitable blowing agents which can be employed in the polymer include, azodicarbonamide, azobisformamide, azobisisobutyronitrile, diazoaminobenzene, N,N'-dinitrosopentane-methylenetetramine, benzenesulfonyl hydrazide, benzene-1,3-disulfonyl hydrazide, diphenylsulfon-3,3'-disulfonyl hydrazide, 4,4'-oxybis(benzenesulfonyl hydrazide) and the like. The blowing agent should be present in the polymer composition in an amount from about 1 percent to about 7 percent and preferably from about 2 percent to about 4 percent by weight based on the weight of the polymer. Amounts of blowing agent less than about 1 percent do not provide sufficient foaming of the polymer to favorably increase the bond strength of the laminate construction. Amounts in excess of about 7 percent produce a foam having excessively large voids which weakens the foam and which in turn produces a laminated product having a very low peel strength.

Metal substrates may be of any metal material suitable for adhering the polymer foam thereto. Examples of particular metals include aluminum, copper, steel, tin plate, black iron and the like.

In one embodiment of the present invention, laminates can be made by (1) placing a polymer film containing a solid decomposable blowing agent on a metal substrate or between such substrates, (2) placing the assembly in a platen press and subjecting said assembly to heat of a temperature below the decomposition temperature of the blowing agent and to pressures sufficient to cause the polymer to become bonded to the metal substrate or substrates, (3) cooling the resulting laminate under pressure and (4) heating said laminate to a temperature of at least 140° C. to expand the polymer layer.

When nonadhesive polymer materials such as polyethylene are combined with a solid decomposable blowing agent to form a foam-metal laminate, the metal is treated to promote the adhesion of the foamed polymer to the metal substrate. However, where adhesive polymers such as a copolymer of ethylene and acrylic acid are employed, metal treatment is unnecessary. Where metal treatment is necessary, various treating methods may be employed. However, it is preferred that the substrate be treated by a two-step process which comprises (1) treating the metal surface with a hexavalent chromium containing, aqueous inorganic acid solution and (2) immediately thereafter treating the same surface again with an organic acid, e.g. (1) chromium trioxide and (2) maleic acid.

The laminate constructions of the present invention are particularly desirable since the foamed polymer employed is characterized by having good tensile strength and, when adhered to a metal substrate, results in a laminated product having excellent peel strength. The laminates of the present invention can be used for providing electrical insulation for electrical wires and cables, making thermally insulating coatings for flexible pipes and the like.

The following examples are illustrative of the invention and are not intended to limit the scope thereof.

EXAMPLE 1

A 1.25 g. portion of azodicarbonamide was dispersed in 50 ml of methanol. The resulting dispersion was mixed into 48.75 g. of finely divided polyethyleneacrylic acid graft copolymer (relative crystallinity of about 50 percent), the copolymer containing acrylic acid in an amount of about 6.9 percent by weight based on the weight of the copolymer. The methanol was evaporated from the resulting mixture leaving a dry powder polymer blend containing about 2.5 percent by weight azodicarbonamide.

A 15 g. portion of the above blend was compression molded in a hydraulic press under a pressure of 10,000 lbs. platen and a temperature of 170° C. for 1 minute yielding a film approximately 0.01 inch thick. Another sample of the polymer contatining no azodicarbonamide or any other additive was similarly compression molded at a temperature of 180° C. and a pressure of 10,000 lbs. platen for 1 minute also yielding a polymer film approximately 0.01 inch thick. The two polymer films were bonded to pieces of soft annealed aluminum foil 6" x 8" x 0.0045" in the manner as described below.

A piece of soft annealed aluminum foil 6" x 8" x 0.0045" was placed on a platen plate covered with a film of poly(ethylene terephthalate). The previously described graft copolymer film containing azodicarbonamide blowing agent was placed on the aluminum and the graft copolymer film containing no blowing agent was placed on the film containing azodicarbonamide. A second platen plate covered with a film of poly(ethylene terephthalate) was placed over the total assembly. This construction was placed in a hydraulic press and subjected to a pressure of 8,000 lbs. platen and a temperature of 180° C. for 90 seconds. The sample was cooled in the press before removing. The purpose of the second film of graft copolymer (the film containing no blowing agent) was to provide support for the foamed polymer. Without this support the foamed polymer would tear under the applied peeling force.

A portion of the above described laminated product was cut into 1-inch strips and tested for peel strength on an Instron testing machine according to the method of ASTM test D903–49 except that a crosshead separation rate of 4 inches per minute was used. These specimens yielded peel strengths of 7–8 lbs./in. width.

The remaining portion of the prepared laminated product was placed in a convection oven maintained at 190° C. for a period of 7 minutes. During this time the azodicarbonamide blowing agent decomposed giving off nitrogen gas which caused the polymer film to foam. After foaming, the sample was removed from the oven, allowed to cool to room temperature, and placed in a constant temperature room for about one hour before testing. Following the conditioning period, the laminated product was cut into 1-inch strips and tested for peel strength on an Instron testing machine according to the method of ASTM D903–49 except that a crosshead separation rate of 4 inches per minute was used. These samples yielded peel strengths of 15–17 lbs./in. width giving approximately a 100 percent increase in peel strength after foaming the polymer.

EXAMPLE 2

A 48.75 gm. sample of high density polyethylene with a melt index of about 3.0 and relative crystallinity of about 65 percent was blended with 1.25 gm. of azodicarbonamide according to the procedure as described in Example 1 to form an azodicarbonamide-containing polymer film. A film containing no blowing agent was prepared from the same starting polyethylene. Each of the above-described films was bonded to an aluminum substrate according to the method and conditions as described in Example 1. However, the aluminum used in each case was surface treated for 5 minutes at 80° C. in an aqueous solution of 5 percent chrominum trioxide, then for 2 minutes at 80° C. in an aqueous solution of 5 percent maleic acid, and dried before adhering the blowing agent-containing polymer film to the aluminum substrate.

The sample was cooled in the press and tested in accordance with the test and under the conditions as described in Example 1. The peel strength of the unfoamed sample was 6.0 lbs./in. width. The foamed sample had a peel strength of 15.5 lbs./in. width.

EXAMPLE 3

The procedure of Example 1 was substantially repeated except that polypropylene having a relative crystallinity of about 50 percent was substituted for the polyethylene-acrylic acid graft copolymer and the polypropylene films were prepared by compression molding the polymer in a hydraulic press under a pressure of 20,000 lbs. platen and a temperature of 200° C. for 1 minute. The polypropylene films were bonded to the aluminum, which was surface treated according to the method described in Example 2, under a pressure of 10,000 lbs. platen and a temperature of 200° C. for 90 seconds. The sample was then sectioned, tested and foamed according to the method and conditions as described in Example 1. The peel strength of the unfoamed sample was 4.0 lbs./in. width and the peel strength of the foamed sample was 9.0 lbs./in. width.

Example 4

Film samples were prepared in accordance with the procedure as described in Example 1, i.e., with and without blowing agent. Each of the two polymer films was assembled into a laminate construction similar to that described in Example 1 except that a piece of steel foil 6" x 8" x 0.001", previously washed in boiling perchloroethylene, was used in place of the aluminum. The polymer films having been bonded to the steel foil were then foamed and tested according to the method and conditions as described in Example 1. The peel strength of the unfoamed sample was 10.8 lbs./in. width and the peel strength of the foamed sample was 19.3 lbs./in. width.

Example 5

Film samples were prepared in accordance with the procedure as described in Example 1, i.e., with and without blowing agent except that low density polyethylene of melt index 1.9 and relative crystallinity of about 65 percent was substituted for the graft copolymer. The aluminum used in this example was surface-treated according to the method as described in Example 2. The two polymer films were bonded to the surface-treated aluminum and the one containing blowing agent was heated to expand the polymer layer. The resulting laminates were tested according to the method as described in Example 1. The peel strength obtained on the unfoamed sample was 3.0 lbs./in. width and on the foamed sample was 37.0 lbs./in. width.

EXAMPLE 6

Film samples were prepared in accordance with the procedure as described in Example 1 except that polybutene-1, having a relative crystallinity of about 42 percent, was substituted for the graft copolymer. The aluminum substrate was surface-treated according to the method as described in Example 2. The two film samples of polybutene-1 were bonded to the surface-treated aluminum, the laminate with the polymer containing blowing agent was heated to expand the film layer and both laminates were tested in accordance with the method and conditions as described in Example 1. The peel strength obtained on the unfoamed portion of this sample was 3.0 lbs./in. width and the peel strength obtained on the foamed portion was 6.8 lbs./in. width.

EXAMPLE 7

In a test not exemplary of the present invention, a random copolymer of ethylene and acrylic acid having a relative crystallinity of about 22 percent was blended with azodicarbonamide in accordance with the method as described in Example 1. The mixture was formed into a film, bonded to an aluminum substrate and the laminate heated to expand the film layer in accordance with the method and conditions as described in Example 1. The foam-metal laminate was tested and found to have a peel strength of about 12.5 lbs./in. An unfoamed film sample bonded to a similar aluminum substrate had a peel strength of about 12.0 lbs./in.

It has been found, as above, that olefin polymers having a relative crystallinity below 30 percent do not produce satisfactory foam materials to form the laminates within the scope of this invention. Such polymers, when expanded, do not have the necessary properties to produce foam-metal laminates having the desired peel strength, i.e., better peel strength than the non-foamed-metal laminate of the same polymer.

In place of the particular polymers and blowing agent used in the foregoing examples, there can be used other materials as hereinbefore described with advantageous results in making foam-metal laminates wherein the particular construction has improved peel strength.

What is claimed is:

1. A process for manufacturing laminated structures in which a layer of a foamed thermoplastic olefin polymer is bonded to a metal substrate such that the peel strength of the foamed thermoplastic olefin polymer is materially greater than the peel strength of a corresponding unfoamed thermoplastic olefin polymer, said process comprising the steps of (1) adhering to at least one metal substrate a layer of a thermoplastic olefin polymer having a relative crystallinity of at least 30 percent, said olefin polymer containing a solid decomposable blowing agent (2) heating the resulting laminate to a temperature of at least 140° C. to expand the polymer layer and (3) subsequently cooling said laminate to room temperature.

2. The process according to claim 1 wherein the thermoplastic olefin polymer is a graft copolymer of polyethylene and acrylic acid.

3. The process according to claim 1 wherein the thermoplastic olefin polymer is polyethylene.

4. The process according to claim 1 wherein the thermoplastic olefin polymer is polypropylene.

5. The process according to claim 1 wherein the thermoplastic olefin polymer is polybutene-1.

6. The process according to claim 1 wherein the blowing agent is azodicarbonamide.

7. The process according to claim 1 wherein the metal substrate is aluminum.

8. A process for manufacturing laminated structures in which a layer of a foamed thermoplastic olefin polymer is bonded to a metal substrate such that the peel strength of the foamed thermoplastic olefin polymer is materially greater than the peel strength of a corresponding unfoamed thermoplastic olefin polymer, said process comprising (1) treating a metal substrate with (a) a hexavalent chromium containing, aqueous inorganic acid solution and (b) immediately thereafter with an organic acid, (2) applying a layer of polyethylene containing azodicarbonamide to the surface of the treated metal, (3) subjecting the resulting assembly to heat of about 170° C. and pressure of about 100 p.s.i. to adhere the polymer layer to the metal and (4) subjecting the resulting laminate to temperatures of from about 180° C. to about 210° C. to expand the polymer layer.

9. The process according to claim 8 wherein the hexavalent chromium containing, aqueous inorganic acid solution contains chromium trioxide and the organic acid is maleic acid.

References Cited

UNITED STATES PATENTS

| | | | |
|---|---|---|---|
| 2,357,513 | 9/1944 | Harmon | 156—79 X |
| 2,668,134 | 2/1954 | Horton. | |
| 2,746,940 | 5/1956 | Cooper et al. | 156—79 X |
| 2,788,333 | 5/1957 | Lewis et al. | |
| 2,838,437 | 6/1958 | Busse et al. | 161—216 X |
| 2,955,972 | 10/1960 | Wintermute et al. | 156—79 |
| 2,970,078 | 1/1961 | Nielsen. | |
| 2,964,799 | 12/1960 | Roggi et al. | 156—242 X |
| 2,998,324 | 8/1961 | Hirt. | |
| 3,320,115 | 5/1967 | Reid et al. | 161—216 X |
| 3,249,570 | 5/1966 | Potts et al. | |

FOREIGN PATENTS 958,337   5/1964   Great Britain.

EARL M. BERGERT, *Primary Examiner.*

C. B. COSBY, *Assistant Examiner.*

U.S. Cl. X.R.

161—160, 216, 247